US011228382B2

United States Patent
Siomina et al.

(10) Patent No.: US 11,228,382 B2
(45) Date of Patent: Jan. 18, 2022

(54) CONTROLLING THE CHANNEL OCCUPANCY MEASUREMENT QUALITY

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 16/072,414

(22) PCT Filed: Feb. 7, 2017

(86) PCT No.: PCT/SE2017/050115
§ 371 (c)(1),
(2) Date: Jul. 24, 2018

(87) PCT Pub. No.: WO2017/138870
PCT Pub. Date: Aug. 17, 2017

(65) Prior Publication Data
US 2019/0149252 A1   May 16, 2019

Related U.S. Application Data

(60) Provisional application No. 62/292,739, filed on Feb. 8, 2016.

(51) Int. Cl.
*H04L 12/00* (2006.01)
*H04B 17/318* (2015.01)
(Continued)

(52) U.S. Cl.
CPC ......... *H04B 17/318* (2015.01); *H04B 17/309* (2015.01); *H04B 17/345* (2015.01); *H04W 24/08* (2013.01); *H04W 24/10* (2013.01)

(58) Field of Classification Search
None
See application file for complete search history.

(56) References Cited

U.S. PATENT DOCUMENTS

2012/0315857 A1   12/2012   Ichikawa
2015/0351105 A1*  12/2015   Lee .................. H04W 72/1226
                                                        370/241.1
(Continued)

OTHER PUBLICATIONS

International Search Report and Written Opinion dated Apr. 7, 2017, for International Application No. PCT/SE2017/050115 filed on Feb. 7, 2017, consisting of 11-pages.
(Continued)

*Primary Examiner* — Noel R Beharry
*Assistant Examiner* — Lionel Preval
(74) *Attorney, Agent, or Firm* — Withrow & Terranova, PLLC

(57) ABSTRACT

Methods and devices for controlling channel occupancy measurement quality are disclosed. A wireless device is configured for carrier aggregation under operation with frame structure type 3. The wireless device is configured to obtain a channel occupancy threshold, obtain a set of received signal strength indication, RSSI, samples on a carrier frequency and obtain a quality criterion for a channel occupancy measurement. The quality criterion defines a quality of an RSSI sample based on whether a value of the RSSI sample is within a range of a value of the channel occupancy threshold. The wireless device is further configured to determine the channel occupancy measurement for the carrier frequency based on the obtained channel occupancy threshold, the quality criterion and at least one RSSI sample of the set of RSSI samples, and perform at least one task based on the channel occupancy measurement.

22 Claims, 5 Drawing Sheets

(51) Int. Cl.
*H04B 17/345* (2015.01)
*H04B 17/309* (2015.01)
*H04W 24/08* (2009.01)
*H04W 24/10* (2009.01)

(56) References Cited

U.S. PATENT DOCUMENTS

| | | | | |
|---|---|---|---|---|
| 2016/0135148 | A1* | 5/2016 | Novlan | H04L 1/00 370/329 |
| 2016/0338118 | A1* | 11/2016 | Vajapeyam | H04L 69/323 |
| 2017/0150382 | A1* | 5/2017 | Martin | H04W 72/042 |
| 2019/0327752 | A1* | 10/2019 | Kim | H04L 5/0048 |

OTHER PUBLICATIONS

3GPP TS 36.133 V13.1.0; 3rd Generation Partnership Project; Technical Specification Group Radio Access Network; Evolved Universal Terrestrial Radio Access (E-UTRA); Requirements for support of radio resource management (Release 13); Sep. 2015, consisting of 1430-pages.
3GPP TS 36.211 V13.0.0; 3rd Generation Partnership Project; Technical Specification Group Radio Access Network; Evolved Universal Terrestrial Radio Access (E-UTRA); Physical channels and modulation (Release 13); Dec. 2015, consisting of 141-pages.
3GPP TS 36.214 V13.0.0; 3rd Generation Partnership Project; Technical Specification Group Radio Access Network; Evolved Universal Terrestrial Radio Access (E-UTRA); Physical layer Measurements (Release 13); Dec. 2015, consisting of 18-pages.
3GPP TS 36.331 V13.0.0; 3rd Generation Partnership Project; Technical Specification Group Radio Access Network; Evolved Universal Terrestrial Radio Access (E-UTRA); Radio Resource Control (RRC) Protocol specification (Release 13); Dec. 2015, consisting of 507-pages.
3GPP TSG-RAN WG2 Meeting #92 R2-156662; Title: "Measurement configurations for LAA"; Source: Sharp; Agenda item: 7.1.2; Document for: Discussion and Decision; Location and Date: Anaheim, USA, Nov. 16-20, 2015, consisting of 3-pages.
3GPP TSG RAN WG2 Meeting #91bis R2-154303; Title: "RSSI measurement for hidden node detection"; Source: ETRI; Agenda Item: 7.1.2; Document for: Discussion and Decision; Location and Date: Malmo, Sweden, Oct. 5-9, 2015, consisting of 5-pages.
3GPP TSG RAN WG2 Meeting #91bis R2-154137; Title: "RSSI measurements"; Source: CMCC; Agenda Item: 7.1.2; Document for: Discussion and Decision; Location and Date: Malmo, Sweden, Oct. 5-9, 2015, consisting of 3-pages.
3GPP TSG RAN WG4 Meeting #78 R4-161001; Title: "Channel occupancy requirements"; Source to WG: Ericsson; Source to TSG: RAN WG4, Work Item code: LTE_LAA-core; Location and Date: Malta, MT Feb. 15-19, 2016, consisting of 3-pages.
Examination Report for European Patent Application No. 17705972.2, dated Jun. 3, 2019, 3 pages.
Examination Report for European Patent Application No. 17705972.2, dated Oct. 1, 2019, 3 pages.

* cited by examiner

CONTROLLING THE CHANNEL OCCUPANCY MEASUREMENT QUALITY

CROSS-REFERENCE TO RELATED APPLICATIONS

This application is a Submission Under 35 U.S.C. § 371 for U.S. National Stage Patent Application of International Application Number: PCT/SE2017/050115, filed Feb. 7, 2017 entitled "CONTROLLING THE CHANNEL OCCUPANCY MEASUREMENT QUALITY," which claims priority to U.S. Provisional Application No. 62/292,739, filed Feb. 8, 2016, entitled "CONTROLLING THE CHANNEL OCCUPANCY MEASUREMENT QUALITY," the entireties of both of which are incorporated herein by reference.

TECHNICAL FIELD

The present disclosure relates to wireless communication networks, and in particular, to controlling channel occupancy measurement quality.

BACKGROUND

Measurements with License Assisted Access (LAA)

In general, LAA or operation based on frame structure type 3 refers to wireless device operation on at least one carrier in non-licensed spectrum such as Band 46 also used for Wi-Fi access, e.g., a wireless device can be configured with carrier aggregation with Primary Cell (PCell) in Band 1 (licensed spectrum) and Secondary Cell (SCell) in Band 46 (unlicensed spectrum). The frame structure type 3 is specified in $3^{rd}$ Generation Partnership Project Technical Specification (3GPP TS) 36.211, which is introduced in Long Term Evolution (LTE) Release-13. A network node such as an evolved NodeB (eNB) operating in the unlicensed band only transmits signals which may be used for wireless device measurements using so called discovery reference symbols (DRS). Unlike CRS (common reference symbols) described in LTE-Release 8, DRS is not transmitted in every subframe, and is instead transmitted periodically (e.g., every 160 ms). Moreover, the network node may perform so called listen before talk (LBT) procedures to check that no other unlicensed node (such as a Wi-Fi access point) is transmitting before it transmits DRS. This means that from a wireless device perspective, the network node may be unable to transmit any particular DRS transmission. In certain regions, LBT functionality is required from a regulatory point of view to ensure fair coexistence of different radios and access technologies on the unlicensed band.

Received Signal Strength Indicator (RSSI) in Evolved Universal Terrestrial Radio Access (E-UTRA)

There are three types of RSSI in E-UTRA: non-reportable RSSI used for Reference Symbol Received Quality (RSRQ) measurements, reportable wireless device RSSI used for LAA, and network node RSSI used for LAA.

The wireless device-reportable RSSI used for LAA is specified in 3GPP TS 36.214, v13.0.0, is described below:

| | |
|---|---|
| Definition | E-UTRA RSSI, comprises the linear average of the total received power (in [W]) observed only in the configured Orthogonal frequency-division multiplexing (OFDM) symbols and in the measurement bandwidth over N number of resource blocks, by the wireless device from all sources, including co-channel serving and non-serving cells, adjacent channel interference, thermal noise etc. |

-continued

| | |
|---|---|
| | Higher layers indicate the measurement duration and which OFDM symbol(s) should be measured by the wireless device. The reference point for the RSSI shall be the antenna connector of the wireless device. If receiver diversity is in use by the wireless device, the reported value shall not be lower than the corresponding RSSI of any of the individual diversity branches |
| Applicable for | RRC_CONNECTED intra-frequency, RRC_CONNECTED inter-frequency |

The wireless device physical layer is capable of performing such RSSI measurements on one or more carriers, if the carrier(s) are indicated by higher layers, and reporting the RSSI measurements to higher layers. The wireless device physical layer provides to higher layers a single RSSI sample for each OFDM symbol within each configured RSSI measurement duration occurring with a configured RSSI measurement timing configuration periodicity. The wireless device can report RSSI in the range of [−100 dBm, −25 dBm] with 1 dBm resolution, and can also report an indication when RSSI<−100 dBm or RSSI>=−25 dBm. For this RSSI, the L1 (physical layer) averaging duration is pre-defined and it is one OFDM symbol. FIG. 1 shows an example of a reportable RSSI measurement for LAA where the RSSI measurement duration itself is 70 ms and where 70 RSSI samples, i.e., 70 OFDM symbols, are taken over each L1 measurement duration. Further, in FIG. 1, this example RSSI measurement may be configured by the following parameters:

- periodicity of wireless device-reported RSSI measurement duration has values of 40, 80, 160, 320, 640 msec;
- measurement duration of wireless device-reported RSSI measurement is 1, 14, 28, 42, 70 (where L1 in FIG. 1 is the averaging duration and L3 is the averaging window);
- optionally configurable subframe offset for inter-frequency measurement: when the parameter is configured the wireless device measures according to the configured offset, and when the parameter is not configured the starting offset is chosen by the wireless device, e.g., randomly.

As is also shown in the example of FIG. 1, the measurement reporting to the network node, e.g., eNB, includes information used to determine the channel occupancy (CO) such as the average RSSI, which in the case of the example of FIG. 1 is: 210 RSSI samples/210.

Channel Occupancy Measurement

The wireless device-reportable RSSI measurement is used for the channel occupancy measurement, which is a percentage of (per-symbol) samples when the RSSI was above the configured channelOccupancyThreshold for the associated reportConfig. The channel occupancy measurement is reported by the wireless device to the network node via radio resource control (RRC), together with the RSSI:

```
MeasResultForRSSI-r13 ::=    SEQUENCE {
    rssi-Result-r13              RSSI-Range-r13,
    channelOccupancy-r13         INTEGER (0..100)
}
```

According to 3GPP TS 36.331, v13.0.0:
if the measRSSI-ReportConfig is configured within the corresponding reportConfig for this measId:
 2> set the rssi-Result to the average of sample value(s) provided by lower layers in the reportInterval;
 2> set the channelOccupancy to the rounded percentage of sample values which are beyond to the channelOccupancyThreshold within all the sample values in the reportInterval;
where:
ReportInterval::=ENUMERATED {ms120, ms240, ms480, ms640, ms1024, ms2048, ms5120, ms10240, min1, min6, min12, min30, min60, spare3, spare2, spare1}

SUMMARY

The present disclosure advantageously provides a method and apparatus for controlling channel occupancy measurement quality.

According to one aspect of the disclosure, a wireless device for a wireless communication network is provided. The wireless device is configured for carrier aggregation under operation with frame structure type 3. The wireless device configured to obtain a channel occupancy threshold, obtain a set of received signal strength indication, RSSI, samples on a carrier frequency and obtain a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. The wireless device is further configured to determine the channel occupancy measurement for the carrier frequency based on the obtained channel occupancy threshold, the quality criterion and at least one RSSI sample of the set of RSSI samples, and perform at least one task based on the channel occupancy measurement.

According to one embodiment of this aspect, the obtaining of the channel occupancy threshold includes receiving a configuration message from a network node, the configuration message defining the channel occupancy threshold. According to one embodiment of this aspect, the determining of the channel occupancy measurement includes determining whether at least one RSSI sample of the set of RSSI samples meets the quality criterion. According to one embodiment of this aspect, the obtaining of the quality criterion for the channel occupancy measurement includes receiving signaling, from a node, corresponding to the quality criterion.

According to one embodiment of this aspect, the obtaining of the quality criterion for the channel occupancy measurement includes calculating the quality criterion. According to one embodiment of this aspect, if the determination is made that at least one RSSI sample of the set of RSSI samples does not meet the quality criterion, the processor is further configured to select a subset of the set of RSSI samples that meet the quality criterion for determining the channel occupancy measurement for the carrier frequency. According to one embodiment of this aspect, the wireless device is further configured to: if the determination is made that at least one RSSI sample of the set of RSSI samples does not meet the quality criterion: assign a first numerical weight to the at least one RSSI sample of the set of RSSI samples that does not meet the quality criterion and assign a second numerical weight to a to a remaining at least one RSSI sample of the set of RSSI samples that meet the quality criterion. The first numerical weight is lower than the second numerical weight. The channel occupancy measurement for the carrier frequency is determined based on the first numerical weight and second numerical weight.

According to one embodiment of this aspect, the quality criterion is based on interference characteristics. According to one embodiment of this aspect, the quality criterion for the channel occupancy measurement is based on a capability of the wireless device to perform at least one measurement in a predefined manner. According to one embodiment of this aspect, the performing of the at least one task includes at least one of sending at least one result of the channel occupancy measurement and triggering an event based on the channel occupancy measurement. According to one embodiment of this aspect, the performing of at least one task includes at least one of reporting the channel occupancy measurement to a network node, 12.

According to one embodiment of this aspect, the at least one task includes preventing a reporting of at least one result of the channel occupancy measurement if a predefined number of the RSSI samples of the set of RSSI samples do not meet the quality criterion, and adjusting the channel occupancy threshold based on the channel occupancy measurement.

According to one aspect of the disclosure, a method for a wireless device for a wireless communication network is provided. The wireless device is configured for carrier aggregation under operation with frame structure type 3. A channel occupancy threshold is obtained. A set of received signal strength indication, RSSI, samples on a carrier frequency are obtained. A quality criterion for a channel occupancy measurement is obtained. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. The channel occupancy measurement for the carrier frequency is determined based on the obtained channel occupancy threshold, the quality criterion and at least one RSSI sample of the set of RSSI samples. At least one task is performed based on the channel occupancy measurement.

According to one embodiment of this aspect, the obtaining of the channel occupancy threshold includes receiving a configuration message, the configuration message defining the channel occupancy threshold. According to one embodiment of this aspect, the determining of the channel occupancy measurement includes determining whether at least one RSSI sample of the set of RSSI samples meets the quality criterion. According to one embodiment of this aspect, the obtaining of the quality criterion for the channel occupancy measurement includes receiving signaling, from a node, corresponding to the quality criterion.

According to one embodiment of this aspect, the obtaining of the quality criterion for the channel occupancy measurement includes calculating the quality criterion. According to one embodiment of this aspect, if the determination is made that at least one RSSI sample of the set of RSSI samples does not meet the quality criterion, a subset of the set of RSSI samples that meet the quality criterion are selected for determining the channel occupancy measurement for the carrier frequency. According to one embodiment of this aspect, if the determination is made that at least one RSSI sample of the set of RSSI samples does not meet the quality criterion: a first numerical weight is assigned to the at least one RSSI sample of the set of RSSI samples that does not meet the quality criterion and a second numerical weight is assigned to a to a remaining at least one RSSI sample of the set of RSSI samples that meet the quality criterion, the first numerical weight being lower than the second numerical weight. The channel occupancy measurement for the carrier frequency is determined based on the first numerical weight and second numerical weight.

According to one embodiment of this aspect, the quality criterion is based on interference characteristics. According to one embodiment of this aspect, the quality criterion for the channel occupancy measurement is based on a capability of the wireless device to perform at least one measurement in a predefined manner. According to one embodiment of this aspect, the performing of the at least one task includes at least one of sending at least one result of the channel occupancy measurement and triggering an event based on the channel occupancy measurement.

According to one embodiment of this aspect, the performing of at least one task includes at least one of reporting the channel occupancy measurement, preventing a reporting of at least one result of the channel occupancy measurement if a predefined number of the RSSI samples of the set of RSSI samples do not meet the quality criterion, and adjusting the channel occupancy threshold based on the channel occupancy measurement.

According to aspect of the disclosure, a node for a wireless communication network is provided. The node is configured to obtain a channel occupancy threshold and obtain a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. The node is configured to configure a wireless device to perform the channel occupancy measurement based on the channel occupancy threshold and the quality criterion. The wireless device is configured for carrier aggregation under operation with frame structure type 3.

According to one embodiment of this aspect, the obtaining of the quality criterion for the channel occupancy measurement includes receiving signaling, from a node, corresponding to the quality criterion. According to one embodiment of this aspect, the obtaining of the quality criterion for the channel occupancy measurement includes calculating the quality criterion. According to one embodiment of this aspect, the quality criterion is based on interference characteristics.

According to one embodiment of this aspect, the quality criterion for the channel occupancy measurement is based on a capability of the wireless device to perform at least one measurement in a predefined manner.

According to one aspect of the disclosure, a method for a node for a wireless communication network is provided. A channel occupancy threshold is obtained. A quality criterion for a channel occupancy measurement is obtained. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. A wireless device is configured to perform the channel occupancy measurement based on the channel occupancy threshold and the quality criterion. The wireless device is configured for carrier aggregation under operation with frame structure type 3.

According to one embodiment of this aspect, the obtaining of the quality criterion for the channel occupancy measurement includes receiving signaling, from a node, corresponding to the quality criterion. According to one embodiment of this aspect, the obtaining of the quality criterion for the channel occupancy measurement includes calculating the quality criterion. According to one embodiment of this aspect, the quality criterion is based on inference characteristics.

According to one embodiment of this aspect, the quality criterion for the channel occupancy measurement is based on a capability of the wireless device to perform at least one measurement in a predefined manner.

According to one aspect of the disclosure, a wireless device for a wireless communication network is provided. The wireless device is configured for carrier aggregation under operation with frame structure type 3. The wireless device includes means for obtaining a channel occupancy threshold, means for obtaining a set of received signal strength indication, RSSI, samples on a carrier frequency and means for obtaining a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. The wireless device includes means for determining the channel occupancy measurement for the carrier frequency based on the obtained channel occupancy threshold, the quality criterion and at least one RSSI sample of the set of RSSI samples, and means for performing at least one task based on the channel occupancy measurement.

According to aspect of the disclosure, a wireless device for a wireless communication network is provided. The wireless device is configured for carrier aggregation under operation with frame structure type 3. The wireless device includes processing circuitry. The processing circuitry including a processor and a memory. The memory contains instructions that, when executed by the processor, configure the processor to: obtain a channel occupancy threshold, obtain a set of received signal strength indication, RSSI, samples on a carrier frequency, obtain a quality criterion for a channel occupancy measurement, determine the channel occupancy measurement for the carrier frequency based on the obtained channel occupancy threshold, the quality criterion and at least one RSSI sample of the set of RSSI samples, and perform at least one task based on the channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value.

According to aspect of the disclosure, a node for a wireless communication network is provided. The node includes means for obtaining a channel occupancy threshold, means for obtaining a quality criterion for a channel occupancy measurement, and means for configuring a wireless device to perform the channel occupancy measurement based on the channel occupancy threshold and the quality criterion, the wireless device being configured for carrier aggregation under operation with frame structure type 3. The quality criterion defines a quality of an RSSI sample based on whether a value of the RSSI sample is within a range of a value of the channel occupancy threshold, the threshold being defined by the value of the channel occupancy threshold plus an RSSI measurement accuracy value and the value of the channel occupancy threshold minus the RSSI measurement accuracy value; and According to aspect of the disclosure, a node for a wireless communication network is provided. The node includes processing circuitry. The processing circuitry includes a processor and a memory. The memory contains instructions that, when executed by the processor, configure the processor to: obtain a channel occupancy threshold, obtain a quality criterion for a channel occupancy measurement, and configure a wireless device to perform the channel occupancy measurement based on the channel occupancy threshold and the quality criterion, the wireless device being configured for carrier aggregation under operation with frame structure type 3. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
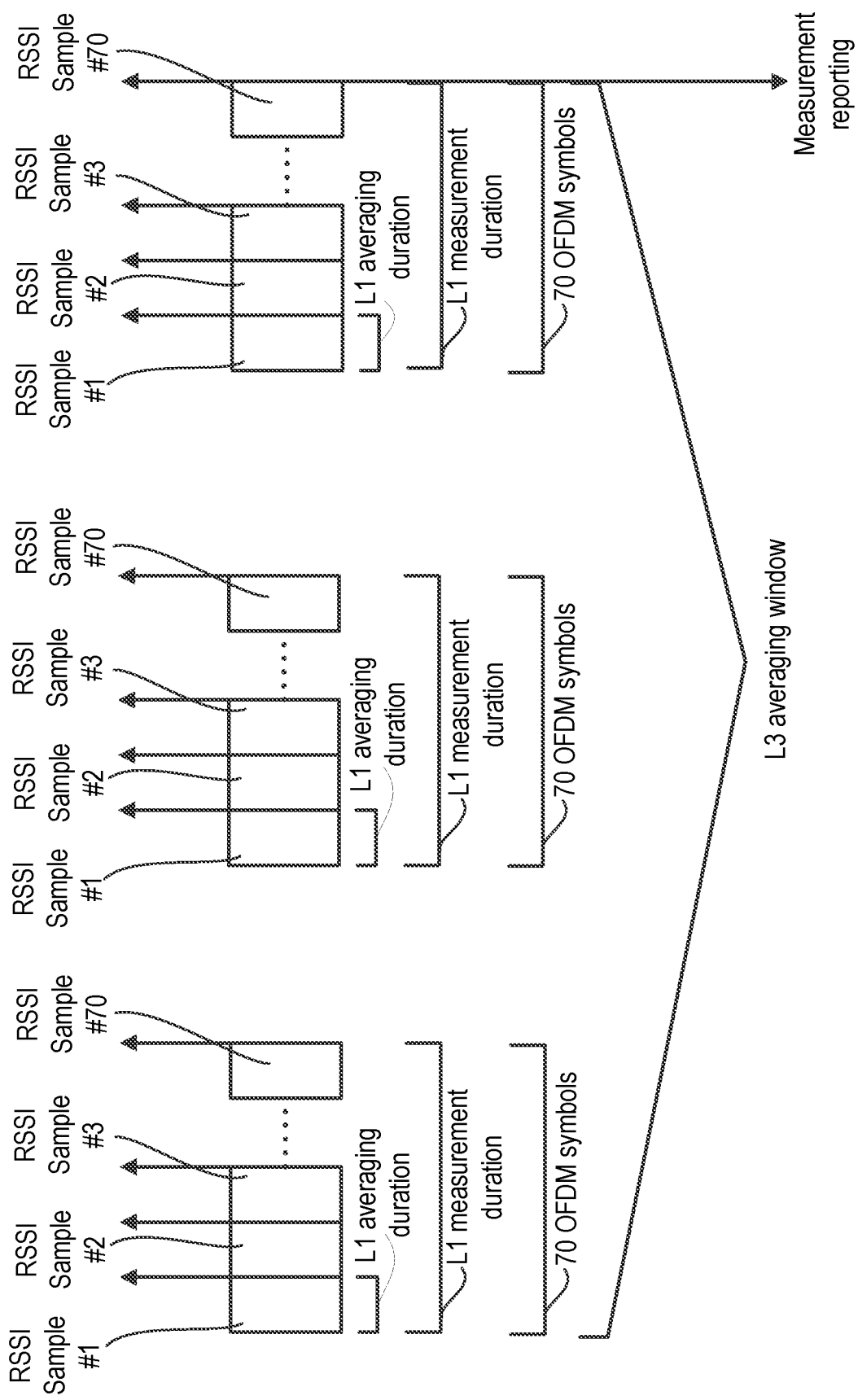
FIG. 1 is a graph of wireless device-reportable RSSI measurement for LAA with the RSSI measurement duration of 70 ms.

Existing systems disadvantageously have no measurement and accuracy requirements for the channel occupancy measurement such that there is no way to ensure and verify the accuracy of this measurement. This disclosure solves the problems with existing systems by controlling channel occupancy measurement quality as described herein. For example, the disclosure helps ensure that wireless device reported measurement results, e.g., channel occupancy measurements, meet certain accuracy requirements. Further, the disclosure advantageously provides for reporting of channel occupancy measurement results in various operating conditions such as normal conditions, extreme conditions, etc.

Also, the disclosure advantageously allows for a network node to interpret the received channel occupancy measurement results because the criteria for obtaining and reporting the results takes into account the predefined accuracy requirements of the RSSI measurement.

Before describing in detail exemplary embodiments that are in accordance with the disclosure, it is noted that the embodiments reside primarily in combinations of apparatus/node/wireless device components and processing steps related to channel occupancy measurement quality. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Any two or more embodiments described herein may be combined in any way with each other. Furthermore, even though the examples herein are given in the LAA context, the embodiments described herein are not limited to LAA and can also apply in a more general case when the wireless device may need to configure measurement period adaptively to one or more conditions, e.g., channel quality, Ês/Iot (e.g., as defined in 3GPP TS 36.133 where: Ês is the received energy per RE, power normalized to the subcarrier spacing, during the useful part of the symbol, i.e. excluding the cyclic prefix, at the wireless device antenna connector; Iot is the received power spectral density of the total noise and interference for a certain RE, power integrated over the RE and normalized to the subcarrier spacing, as measured at the wireless device antenna connector), signal-to-interferenceplus-noise ratio (SINR), received signal quality, total interference or interference on a specific resources or from a specific interferer(s), etc. Other non-limiting examples where the method is particularly beneficial include measurement s for discontinuous reception (DRX) or extended DRX, and measurement s in high speed train environments.

In some embodiments a non-limiting term "wireless device" is used. The wireless device herein can be any type of wireless device capable of communicating with network node or another wireless device over radio signals. The wireless device may also be radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. Network node can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc.

The term "radio node" used herein may be used to denote a wireless device or a radio network node.

The embodiments are applicable to single carrier as well as to multicarrier or carrier aggregation (CA) operation of the wireless device in which the wireless device is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers, or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "signaling" used herein may include any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "conditions" used herein in general referrer to radio conditions. The radio conditions may be described e.g. by any one or more of: presence or absence (e.g., due to muting or LBT) of a certain signal or transmissions of a certain type or from a certain node, channel quality, $\hat{E}s/Iot$ (e.g., as defined in 3GPP TS 36.133 where: $\hat{E}s$ is the received energy per RE, power normalized to the subcarrier spacing, during the useful part of the symbol, i.e. excluding the cyclic prefix, at the wireless device antenna connector; Iot is the received power spectral density of the total noise and interference for a certain RE, power integrated over the RE and normalized to the subcarrier spacing, as measured at the wireless device antenna connector), SINR, SIR (signal to interference ratio), SNR (signal to noise ratio), received signal quality, received signal strength, total interference or interference on specific time and/or frequency resources or from a specific interferer(s), RSRP, RSRQ, CSI-RSRP (channel state information-RSRP). An example of radio conditions corresponding to two different measurement periods: $Es/Iot>=threshold1$ and $threshold1>Es/Iot>=threshold2$.

The term "measurement" herein refers to radio measurements. Some examples of the radio measurements are: RSSI measurement, channel occupancy measurement, Wi-Fi RSSI measurement, signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring measurements (RLM), CSI, PMI, cell detection, cell identification, number of successful reports, number of ACKs/NACKs, failure rate, error rate, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum.

Figure 2:
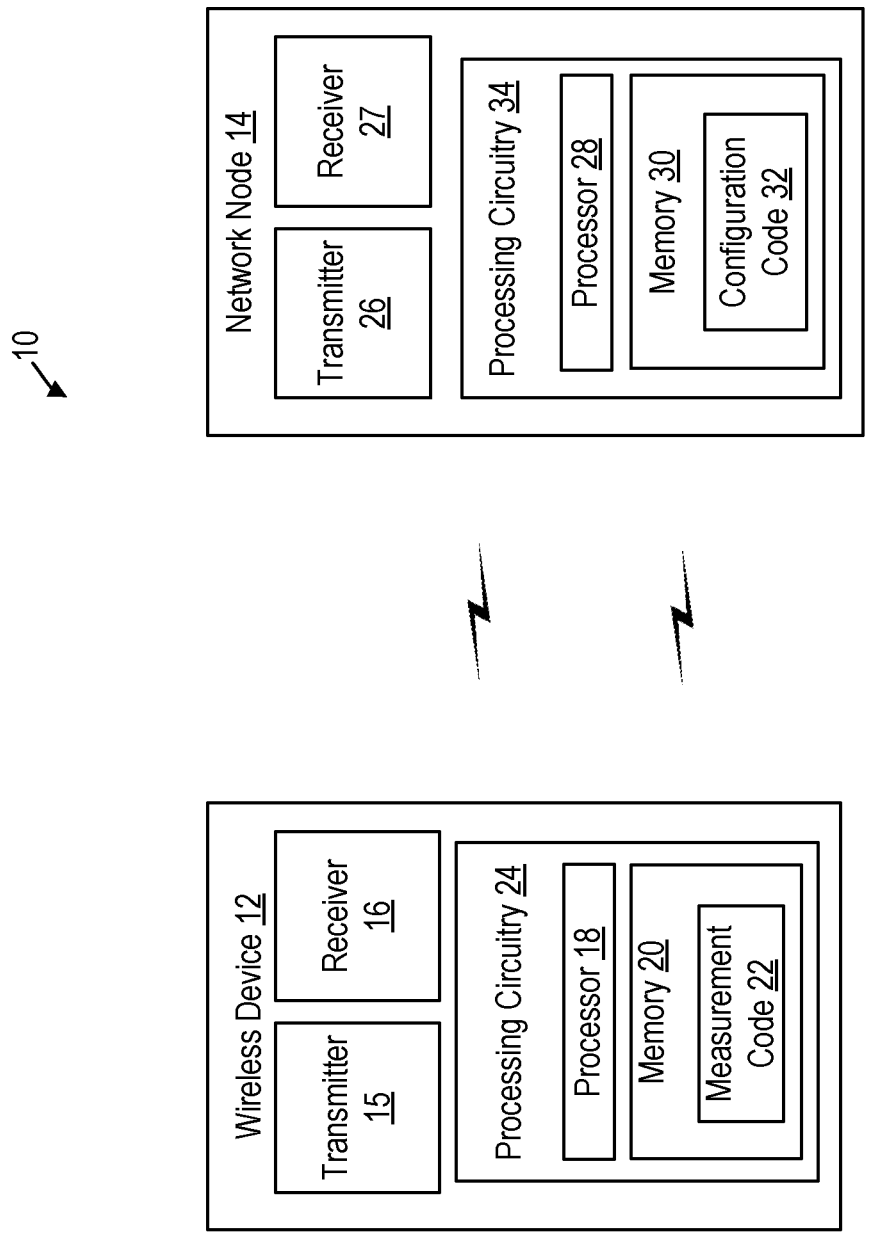
FIG. 2 is a block diagram of an exemplary system for controlling channel occupancy measurement quality in accordance with the principles of the disclosure.

Referring now to the drawing figures in which like reference designators refer to like elements there is shown in FIG. 2 an exemplary system for controlling channel occupancy measurement quality in accordance with the principles of the disclosure and designated generally as "10." System 10 includes one or more wireless devices 12 and one or more network nodes 14 in communication with each other via one or more communication link, paths and/or networks. In one or more embodiments, wireless device 12 is configured for carrier aggregation under operation with frame structure type 3. Wireless device 12 includes one or more transmitters 15 and one or more receivers 16 for communicating with network node 14, other wireless devices 12 and/or other entities in system 10 via one or more communication protocols such as LTE based communication protocols. In one or more embodiments, one or more transmitters 15 and one or more receivers 16 are one or more communication interfaces for transmitting and/or receive communication signals, packets, etc. Wireless device 12 includes one or more processors 18 for performing wireless device 12 functions described herein.

Wireless device 12 includes memory 20 that is configured to store data, programmatic software code and/or other information as described herein. Memory 20 is configured to store programmatic software code such as measurement code 22. For example, measurement code includes instructions that, when executed by processor 18, causes processor 18 to perform the process discussed in detail with respect to FIG. 3. In one or more embodiments, processor 18 and memory 20 form processing circuitry 24. Memory 20 contains instructions that, when executed by processor 18, configure processor 18 to perform one or more functions described with respect to FIG. 3. In addition to a traditional processor and memory, processing circuitry 30 may comprise integrated circuitry for processing and/or control, e.g., one or more processors and/or processor cores and/or FPGAs (Field Programmable Gate Array) and/or ASICs (Application Specific Integrated Circuitry). Processor 18 may be configured to access (e.g., write to and/or reading from) memory 20, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 20 may be configured to store code executable by processor 18 and/or other data, e.g., data pertaining to communication, e.g., configuration and/or address data of nodes, etc.

Processing circuitry 24 may be configured to control any of the methods and/or processes described herein and/or to cause such methods and/or processes to be performed, e.g., by wireless device 12. Corresponding instructions may be stored in the memory 20, which may be readable and/or readably connected to processor 18. In other words, processing circuitry 24 may comprise a microprocessor and/or microcontroller and/or FPGA (Field-Programmable Gate Array) device and/or ASIC (Application Specific Integrated Circuit) device.

Network node 14 includes one or more transmitters 26 and one or more receivers 27 for communicating with wireless device 12, other network nodes 12 and/or other entities in system 10 via one or more communication protocols such as LTE based communication protocols. In one or more embodiments, one or more transmitter 26 and one or more receivers 27 are one or more communication interfaces for transmitting and/or receive communication signals, packets, etc. Network node 14 includes one or more processors 28 for performing network node 14 functions described herein.

Network node 14 includes memory 30 that is configured to store data, code and/or other information as described herein. Memory 30 is configured to store programmatic code such as configuration code 32. For example, configuration code 32 includes instructions that, when executed by processor 28, causes processor 28 to perform the process discussed in detail with respect to FIG. 4. In one or more embodiments, processor 28 and memory 30 form processing circuitry 34. Memory 30 contains instructions that, when executed by processor 28 configure processor 28 to perform one or more functions described with respect to FIG. 4. In addition to a traditional processor and memory, processing circuitry 34 may comprise integrated circuitry for processing and/or control, e.g., one or more processors and/or processor cores and/or FPGAs (Field Programmable Gate Array) and/or ASICs (Application Specific Integrated Circuitry). Processor 28 may be configured to access (e.g., write to and/or reading from) memory 30, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by processor 28 and/or other data, e.g., data pertaining to communication, e.g., configuration and/or address data of nodes, etc.

Processing circuitry 34 may be configured to control any of the methods and/or processes described herein and/or to cause such methods and/or processes to be performed, e.g., by network node 14. Corresponding instructions may be stored in the memory 30, which may be readable and/or readably connected to processor 28. In other words, processing circuitry 34 may comprise a microprocessor and/or microcontroller and/or FPGA (Field-Programmable Gate Array) device and/or ASIC (Application Specific Integrated Circuit) device.

Figure 3:
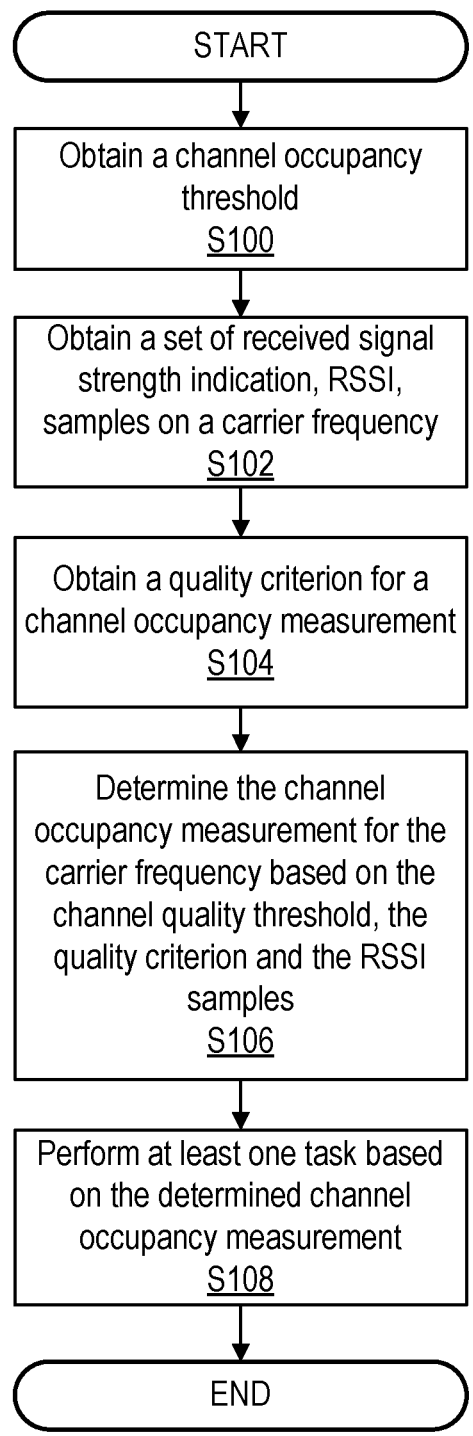
FIG. 3 is a flow diagram of an exemplary measurement process for obtaining channel occupancy measurements in accordance with the principles of the disclosure.

FIG. 3 is a flow diagram of an exemplary measurement process for obtaining channel occupancy measurements. Processing circuitry 24 obtains a channel occupancy threshold (Block S100). The threshold may be expressed in terms of RSSI, e.g., RSSI of −70 dBm. The channel occupancy threshold may be pre-defined, default or pre-configured, based on wireless device 12 measurements, based on historical data, based on previously used value if no new threshold value is provided to wireless device 12, derived based on a pre-defined rule, or configured by another node (e.g., via RRC by network node 14, as described in the Channel Occupancy Measurement section above). The threshold may be obtained by wireless device 12 autonomously or with the assistance from another node.

Processing circuitry 24 obtains a set of received signal strength indication RSSI samples on a carrier frequency (Block S102). In one or more embodiments, each set includes at least one RSSI sample. The term "RSSI sample" may refer to an RSSI sample as described for the wireless device-reported RSSI described in the Measurements with LAA section above or to an RF sample in general. The set of RSSI samples may be obtained on one or more of: pre-defined resources, default or pre-configured resources, and resource configured by another node (e.g., via RRC), where the resources may comprise, e.g., any one or more of: carrier frequency, bandwidth, time resources (e.g., symbols, subframes, radio frames), time period or measurement interval. The resources may also be indicated by a pattern.

Processing circuitry 24 obtains a quality criterion for a channel occupancy measurement (Block S104). Wireless device 12 obtains one or more quality criteria for a channel occupancy measurement. The obtaining may comprise using pre-define criteria or may be based, e.g., one or more of: a pre-defined rule, a function, pre-configuration, wireless device 12 measurements (e.g., wireless device 12 RSSI measurements or other measurements), history, and signaling from another node. The obtaining may also involve calculation or evaluation.

Some examples of the quality criteria:

All or at least some (e.g., a certain number or a certain portion) of the RSSI sample values do not belong to a range of values determined by a function $f(\bullet)$ of at least the channel occupancy threshold and an offset or delta ($\Delta$), where e.g. one or more of the below may apply:

- function $f(\bullet)$ may be, e.g., $f$ (channelOccupancyThreshold, $\Delta$) or $f$ (channelOccupancyThreshold, $\Delta_1$, $\Delta_2$, ..., [...]);
- function $f(\bullet)$ may be pre-defined;
- function $f(\bullet)$ and/or at least one of its parameters may depend on the wireless device 12's capability or the wireless device 12's ability to operate or perform measurements in a certain way;
- function $f(\bullet)$ may be channelOccupancyThreshold−$\Delta \leq x \leq$ channelOccupancyThreshold+$\Delta$ or channelOccupancyThreshold−$\Delta_1 \leq x \leq$ channelOccupancyThreshold+$\Delta_2$ where x is any value within the range;
- $\Delta$ may be pre-defined or obtained by a rule or selected from a table;
- $\Delta$ may be autonomously determined by wireless device 12;
- $\Delta$ may be based on or derived from the RSSI accuracy requirement, e.g., $\Delta=A$, where the RSSI accuracy requirement is ±A dBm such as ±2.5 dBm (giving $\Delta=A=2.5$) in normal conditions for intra-frequency RSSI (see Table 1). The value of A may also depend on the frequency and/or its relation to the serving frequency, e.g., A may be different for intra-frequency RSSI samples and inter-frequency RSSI samples.

| Accuracy | | | Conditions Io [Note 1] range | |
|---|---|---|---|---|
| Normal condition dB | Extreme condition dB | E-UTRA operating band groups [Note 4] | Minimum Io dBm/ 15 kHz [Note 3] | Maximum Io dBm/ $BW_{Channel}$ |
| ±2.5 | ±5.5 | FS3_G | −118 | −50 |
| ±4.5 | ±7.5 | Note 2 | Note 2 | Note 2 |

Note 1
Io is assumed to have constant EPRE across the bandwidth.
Note 2:
The same bands and the same Io conditions for each band apply for this requirement as for the corresponding highest accuracy requirement.
Note 3
The condition level is increased by Δ > 0, when applicable, as described in Sections B.4.2 and B.4.3.
Note 4
E-UTRA operating band groups are as defined in Section 3.5.

The obtaining and the quality criteria may further depend, e.g., on one or more of:
wireless device 12 capability related to channel occupancy measurement and/or RSSI measurement;
frequency and its relation to the serving frequency (e.g., different for intra-frequency and inter-frequency or CA);
environmental conditions or conditions that impact the accuracy of measurements (e.g., wireless device 12 RSSI measurements), e.g., normal or extreme conditions;
expected or predicted interference conditions at wireless device 12;
wireless device 12 performance level (e.g., a poor performance level may be due to high interference);
interference dynamics and interference characteristics;
using LBT by neighbor radio network nodes;
using LBT by wireless devices 12;
system radio parameters, e.g., bandwidth, carrier frequency;
wireless device 12 RSSI and/or channel occupancy configuration;
wireless device 12 general measurement configuration, e.g., if they impact how the wireless device 12 will be measuring RSSI and/or channel occupancy.

Processing circuitry 24 determines the channel occupancy measurement for the carrier frequency (Block S106). In one or more embodiments, processing circuitry 24 determines the channel occupancy measurement for the carrier frequency based on the channel quality threshold, the quality criterion and the RSSI samples. For example, any one or more of the below may apply:
wireless device 12 adapts its behavior, depending on whether at least one, some, or all quality criteria are fulfilled or not, e.g., wireless device 12 may apply one or more of:
when the target RSSI samples (e.g., all or at least a desired portion of them) meet the quality criteria, the UE may be:
including all the target RSSI samples in the channel occupancy measurement and/or RSSI measurement;
reporting a measurement using the RSSI samples according to the background section;
performing and/or reporting a measurement based on the RSSI samples while meeting one or more requirements (e.g., channel occupancy accuracy requirement), etc.;
when at least one, a certain number or a portion, or all of the RSSI samples do not fulfill one, some, or all quality criteria, wireless device 12 may be:
dropping or avoiding to perform/report a measurement based on a set of RSSI samples where at least N samples (N=1, . . . ) or at least X % of samples do not meet the quality criteria;
selecting for a measurement a subset of RSSI samples from the set of RSSI samples (e.g., the samples that meet the quality criteria);
performing and/or reporting a measurement based on the RSSI samples in a best effort or with a certain degradation with respect to one or more requirements (e.g., channel occupancy accuracy requirement);
performing and/or reporting a measurement while meeting one or more requirements (e.g., channel occupancy accuracy requirement), where the requirements are depending on one or more of: the quality criteria, the number of RSSI samples fulfilling the quality criteria, the number of RSSI samples not fulfilling the quality criteria, the amount of "violating" the quality criteria, etc.
indicating to another node (e.g., network node that at least some RSSI samples do not meet the quality criteria), etc.;
selectively including the samples fulfilling the quality criteria in the channel occupancy measurement and/or RSSI measurement;
selectively giving a higher weight or priority for the samples fulfilling the quality criteria, etc.;
selectively excluding the samples not fulfilling the quality criteria from the channel occupancy measurement and/or RSSI measurement, giving a lower weight or priority for the sample, etc.
wireless device 12 applies autonomous adjustment to the channelOccupancyThreshold to be used for calculating the channel occupancy/creating the channel occupancy measurement, e.g., wireless device 12 may increase or decrease the channelOccupancyThreshold when some or all RSSI samples do not meet the quality criteria, e.g., being too close to the threshold from one side. The values of the maximum allowed adjustment (increase or decrease) can be selected by wireless device 12 autonomously, be pre-defined, determined based on a pre-defined rule, or configured by network node 14.

In one or more embodiments, processing circuitry 24 sends at least one result of the channel occupancy measurement. A result for the obtained measurement may comprise, e.g., any of: the measurement itself; an indication of how the measurement was performed; the number of samples included in the measurement or an indication of whether some or all of the configured samples or samples from the obtained set of RSSI samples were included in the measurement; and indication whether wireless device 12 has adjusted the channelOccupancyThreshold when performing the channel occupancy and/or RSSI measurement in which wireless device 12 may also indicate the amount of the adjustment it has applied e.g. increased the channelOccupancyThreshold by 3 dB. In one or more embodiments, Block S108 may be skipped or omitted from the measurement process of FIG. 3 based on design choice. In other words, Block S108 is optional.

Processing circuitry 24 performs at least one task based on the determined channel occupancy measurement (Block S108). Examples of operational tasks include reporting the results of measurements or an event triggered based on the measurement, RRM, mobility (e.g. cell change, cell selection, etc.), positioning, channel assessment for LAA, etc.

An example wireless device implementation based on the embodiments described above may be ensured by a set of channel occupancy measurement accuracy requirements, e.g., as below:

Channel Occupancy Measurements—Intra-Frequency Channel Occupancy Measurement Accuracy Requirements NOTE: These requirements are applicable only for CA under operation with frame structure 3. Wireless device 12 shall be able to correctly evaluate the intra-frequency channel occupancy configured according to 3GPP TS 36.331, provided all the RSSI samples reported by the wireless device physical layer which are used for the channel occupancy measurement meet the following quality criteria with respect to the configured channelOccupancyThreshold:

the RSSI sample values are below channelOccupancyThreshold−$\Delta_{RSSI}$, or the RSSI sample values are above channelOccupancyThreshold+$\Delta_{RSSI}$, where $\Delta_{RSSI}$ is the applicable RSSI measurement accuracy value from the RSSI measurement accuracy requirements.

Channel Occupancy Measurements—Inter-Frequency Channel Occupancy Measurement Accuracy Requirements In one embodiment, wireless device 12 should be able to correctly evaluate the inter-frequency channel occupancy configured according to 3GPP TS 36.331, provided all the RSSI samples reported by the wireless device 12 physical layer which are used for the channel occupancy measurement meet the following quality criteria with respect to the configured channelOccupancyThreshold:

the RSSI sample values are below channelOccupancyThreshold−$\Delta_{RSSI}$, or the RSSI sample values are above channelOccupancyThreshold+$\Delta_{RSSI}$, where $\Delta_{RSSI}$ is the applicable RSSI measurement accuracy value from the RSSI measurement accuracy requirements.

Figure 4:
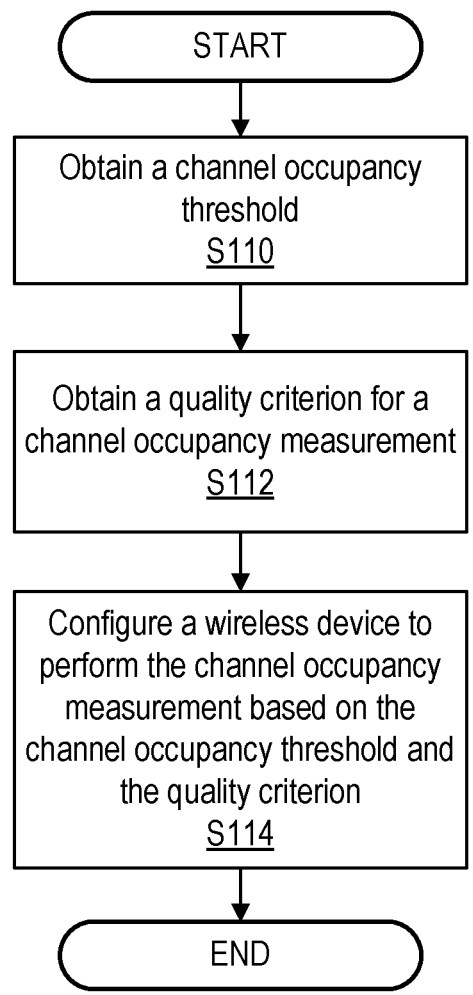
FIG. 4 is a flow diagram of an exemplary configuration process for controlling channel occupancy measurement quality in accordance with the principles of the disclosure.

FIG. 4 is a flow diagram of an exemplary configuration process for controlling channel occupancy measurement quality. Processing circuitry 34 obtain a channel occupancy threshold (Block S110). Processing circuitry 34 is configured to obtain a quality criterion for a channel occupancy measurement (Block S112). In one embodiment, a plurality of quality criteria for a channel occupancy measurement are obtained. According to this step, network node 14 is obtaining one or more quality criteria for a channel occupancy measurement. Some examples of the quality criteria or criterion are discussed above. The obtaining of one or more quality criteria may comprise using pre-define criteria or the obtaining may be based on, e.g., one or more of: a pre-defined rule, a function, pre-configuration, wireless device 12 measurements (e.g., wireless device RSSI measurements or other measurements), history, and signaling from another node. The obtaining may also involve calculation or evaluation.

The obtaining of one or more quality criteria may be performed dynamically, semi-statically, or statically. The quality criteria may also be wireless device-specific or cell specific or network-specific.

The obtaining and the quality criterion may further depend, e.g., on one or more of:

wireless device 12 capability related to channel occupancy measurement and/or RSSI measurement;

frequency and its relation to the serving frequency (e.g., different for intra-frequency and inter-frequency or CA);

environmental conditions or conditions that impact the accuracy of measurements (e.g., wireless device RSSI measurements), e.g., normal or extreme conditions;

expected or predicted interference conditions at wireless device 12;

wireless device 12 performance level (e.g., a poor performance level may be due to high interference);

interference dynamics and interference characteristics;

using LBT by neighbor radio network nodes;

using LBT by wireless devices 12;

system radio parameters, e.g., bandwidth, carrier frequency;

wireless device 12 general measurement configuration, e.g., if they impact how wireless device 12 will be measuring RSSI and/or channel occupancy; and the wireless device RSSI and/or channel occupancy configuration.

Processing circuitry 34 configures wireless device 12 to perform the channel occupancy measurement based on the channel occupancy threshold and the quality criterion, e.g., processing circuitry 34 uses the obtained quality criterion for configuring wireless device 12 for a channel occupancy measurement and/or RSSI measurement (Block S114). Network node 14 is using the obtained quality criterion for configuring at least one parameter for a channel occupancy measurement and/or RSSI measurement for at least one wireless device 12, e.g., any one or more of:

configuring in network node 14 (e.g., the parameter is determined in network node 14 and may then be further used for configuring a channel occupancy measurement and/or RSSI measurement);

configuring in wireless device 12 or another network node 14 by sending, e.g., the quality criteria or a message or an indication or a trigger based on the quality criteria so that the wireless device 12 is using the quality criteria to configure at least one parameter for a channel occupancy measurement and/or RSSI measurement.

Some examples of the at least one parameter:

channelOccupancyThreshold;

an offset or amount of adjustment that can be applied to the channelOccupancyThreshold;

an indication to allow wireless device 12 to autonomously adjust the channelOccupancyThreshold in case some or all RSSI samples do not meet the quality criteria;

the maximum amount of the adjustment wireless device 12 is allowed to apply e.g. allowed to increase the threshold by not more than 3 dB;

channel occupancy measurement and/or RSSI measurement configuration parameter (e.g., duration, periodicity, number of sample, reporting interval, etc.), e.g., when a higher accuracy channel occupancy measurement is desired the network node may configure more RSSI samples for the measurement and/or more frequent measurement;

a timer associated with a wireless device channel occupancy measurement, e.g., obtaining more accurate channel occupancy measurement may require more time and thus a larger timer.

In one or more embodiments, processing circuitry 34 sends at least one of the channel occupancy measurement configuration and RSSI measurement configuration, i.e., sends the channel occupancy measurement configuration and/or RSSI measurement configuration, based on the obtained quality criteria, to at least one wireless device 12.

Network node 14 is sending the channel occupancy measurement configuration and/or RSSI measurement configuration, based on the obtained quality criterion, to at least one wireless device 12.

In one or more embodiments, processing circuitry 34 sends the at least one quality criterion, i.e., sends the obtained quality criterion to another node (e.g., wireless device 12 or another network node 14). Network node 14 is sending the obtained quality criterion to another node (e.g., wireless device 12 or another network node 14). The sending may be upon a request or in an unsolicited way, upon a triggering condition or an event.

Figure 5:
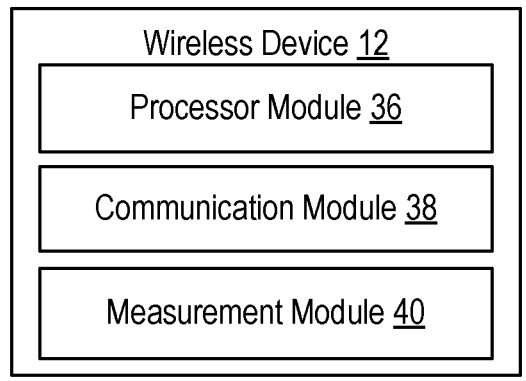
FIG. 5 is a block diagram of another embodiment of wireless device in accordance with the principles of the disclosure.
Figure 6:
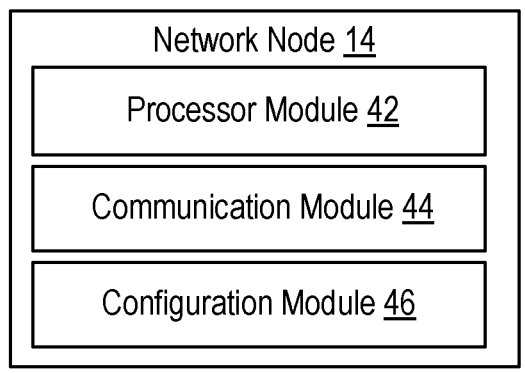
FIG. 6 is a block diagram of another embodiment of network node in accordance with the principles of the disclosure.

FIG. 5 is a block diagram of another embodiment of wireless device 12. In particular, wireless device 12 includes processing module 36 for performing wireless device 12 functions as described herein. Wireless device 12 includes communication module 38 for performing the communication functions described above with respect to transmitter 15 and receiver 16. Wireless device 12 includes measurement module 40 for performing the measurement process for obtaining channel occupancy measurements as described herein. FIG. 6 is a block diagram of another embodiment of network node 14. In particular, network node 14 includes processing module 42 for performing network node 14 functions as described herein. Network node 14 includes communication module 44 for performing the communication functions described above with respect to transmitter 26 and receiver 27. Network node 14 includes configuration module 46 for controlling channel occupancy measurement quality as described herein.

According to one aspect of the disclosure, wireless device 12 for a wireless communication network is provided. Wireless device 12 is configured for carrier aggregation under operation with frame structure type 3. Wireless device 12 is configured to obtain a channel occupancy threshold, obtain a set of received signal strength indication, RSSI, samples on a carrier frequency and obtain a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. Wireless device 12 is further configured to determine the channel occupancy measurement for the carrier frequency based on the obtained channel occupancy threshold, the quality criterion and at least one RSSI sample of the set of RSSI samples, and perform at least one task based on the channel occupancy measurement.

According to one embodiment of this aspect, the obtaining of the channel occupancy threshold includes receiving a configuration message from a network node, the configuration message defining the channel occupancy threshold. According to one embodiment of this aspect, the determining of the channel occupancy measurement includes determining whether at least one RSSI sample of the set of RSSI samples meets the quality criterion. According to one embodiment of this aspect, the obtaining of the quality criterion for the channel occupancy measurement includes receiving signaling, from node 14, corresponding to the quality criterion.

According to one embodiment of this aspect, the obtaining of the quality criterion for the channel occupancy measurement includes calculating the quality criterion. According to one embodiment of this aspect, if the determination is made that at least one RSSI sample of the set of RSSI samples does not meet the quality criterion, the processor is further configured to select a subset of the set of RSSI samples that meet the quality criterion for determining the channel occupancy measurement for the carrier frequency. According to one embodiment of this aspect, wireless device 12 is further configured to: if the determination is made that at least one RSSI sample of the set of RSSI samples does not meet the quality criterion: assign a first numerical weight to the at least one RSSI sample of the set of RSSI samples that does not meet the quality criterion and assign a second numerical weight to a to a remaining at least one RSSI sample of the set of RSSI samples that meet the quality criterion. The first numerical weight is lower than the second numerical weight. The channel occupancy measurement for the carrier frequency is determined based on the first numerical weight and second numerical weight.

According to one embodiment of this aspect, the quality criterion is based on interference characteristics. According to one embodiment of this aspect, the quality criterion for the channel occupancy measurement is based on a capability of the wireless device to perform at least one measurement in a predefined manner. According to one embodiment of this aspect, the performing of the at least one task includes at least one of sending at least one result of the channel occupancy measurement and triggering an event based on the channel occupancy measurement. According to one embodiment of this aspect, the performing of at least one task includes at least one of reporting the channel occupancy measurement to a network node 14.

According to one embodiment of this aspect, the at least one task includes preventing a reporting of at least one result of the channel occupancy measurement if a predefined number of the RSSI samples of the set of RSSI samples do not meet the quality criterion, and adjusting the channel occupancy threshold based on the channel occupancy measurement.

According to one aspect of the disclosure, a method for wireless device 12 for a wireless communication network is provided. Wireless device 12 is configured for carrier aggregation under operation with frame structure type 3. A channel occupancy threshold is obtained. A set of received signal strength indication, RSSI, samples on a carrier frequency are obtained. A quality criterion for a channel occupancy measurement is obtained. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. The channel occupancy measurement for the carrier frequency is determined based on the obtained channel occupancy threshold, the quality criterion and at least one RSSI sample of the set of RSSI samples. At least one task is performed based on the channel occupancy measurement.

According to one embodiment of this aspect, the obtaining of the channel occupancy threshold includes receiving a configuration message, the configuration message defining the channel occupancy threshold. According to one embodiment of this aspect, the determining of the channel occupancy measurement includes determining whether at least one RSSI sample of the set of RSSI samples meets the quality criterion. According to one embodiment of this aspect, the obtaining of the quality criterion for the channel occupancy measurement includes receiving signaling, from a node, corresponding to the quality criterion.

According to one embodiment of this aspect, the obtaining of the quality criterion for the channel occupancy measurement includes calculating the quality criterion. According to one embodiment of this aspect, if the determination is made that at least one RSSI sample of the set of RSSI samples does not meet the quality criterion, a subset of the set of RSSI samples that meet the quality criterion are selected for determining the channel occupancy measurement for the carrier frequency. According to one embodiment of this aspect, if the determination is made that at least one RSSI sample of the set of RSSI samples does not meet the quality criterion: a first numerical weight is assigned to the at least one RSSI sample of the set of RSSI samples that does not meet the quality criterion and a second numerical weight is assigned to a to a remaining at least one RSSI sample of the set of RSSI samples that meet the quality criterion, the first numerical weight being lower than the second numerical weight. The channel occupancy measurement for the carrier frequency is determined based on the first numerical weight and second numerical weight.

According to one embodiment of this aspect, the quality criterion is based on interference characteristics. According to one embodiment of this aspect, the quality criterion for the channel occupancy measurement is based on a capability of the wireless device to perform at least one measurement in a predefined manner. According to one embodiment of this aspect, the performing of the at least one task includes at least one of sending at least one result of the channel occupancy measurement and triggering an event based on the channel occupancy measurement.

According to one embodiment of this aspect, the performing of at least one task includes at least one of reporting the channel occupancy measurement, preventing a reporting of at least one result of the channel occupancy measurement if a predefined number of the RSSI samples of the set of RSSI samples do not meet the quality criterion, and adjusting the channel occupancy threshold based on the channel occupancy measurement.

According to aspect of the disclosure, node 14 for a wireless communication network is provided. Node 14 is configured to obtain a channel occupancy threshold and obtain a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. Node 14 is configured to configure wireless device 12 to perform the channel occupancy measurement based on the channel occupancy threshold and the quality criterion. The wireless device is configured for carrier aggregation under operation with frame structure type 3.

According to one embodiment of this aspect, the obtaining of the quality criterion for the channel occupancy measurement includes receiving signaling, from a node, corresponding to the quality criterion. According to one embodiment of this aspect, the obtaining of the quality criterion for the channel occupancy measurement includes calculating the quality criterion. According to one embodiment of this aspect, the quality criterion is based on interference characteristics.

According to one embodiment of this aspect, the quality criterion for the channel occupancy measurement is based on a capability of wireless device 12 to perform at least one measurement in a predefined manner.

According to one aspect of the disclosure, a method for node 14 for a wireless communication network is provided. A channel occupancy threshold is obtained. A quality criterion for a channel occupancy measurement is obtained. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. Wireless device 12 is configured to perform the channel occupancy measurement based on the channel occupancy threshold and the quality criterion. Wireless device 12 is configured for carrier aggregation under operation with frame structure type 3.

According to one embodiment of this aspect, the obtaining of the quality criterion for the channel occupancy measurement includes receiving signaling, from a node, corresponding to the quality criterion. According to one embodiment of this aspect, the obtaining of the quality criterion for the channel occupancy measurement includes calculating the quality criterion. According to one embodiment of this aspect, the quality criterion is based on inference characteristics.

According to one embodiment of this aspect, the quality criterion for the channel occupancy measurement is based on a capability of wireless device 12 to perform at least one measurement in a predefined manner.

According to one aspect of the disclosure, wireless device 12 for a wireless communication network is provided. Wireless device 12 is configured for carrier aggregation under operation with frame structure type 3. Wireless device 12 includes means for obtaining a channel occupancy threshold, means for obtaining a set of received signal strength indication, RSSI, samples on a carrier frequency and means for obtaining a quality criterion for a channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value. Wireless device 12 includes means for determining the channel occupancy measurement for the carrier frequency based on the obtained channel occupancy threshold, the quality criterion and at least one RSSI sample of the set of RSSI samples, and means for performing at least one task based on the channel occupancy measurement.

According to aspect of the disclosure, wireless device 12 for a wireless communication network is provided. Wireless device 12 is configured for carrier aggregation under operation with frame structure type 3. Wireless device 12 includes processing circuitry 24. Processing circuitry 24 including processor 18 and memory 20. Memory 20 contains instructions that, when executed by processor 18, configure processor 18 to: obtain a channel occupancy threshold, obtain a set of received signal strength indication, RSSI, samples on a carrier frequency, obtain a quality criterion for a channel occupancy measurement, determine the channel occupancy measurement for the carrier frequency based on the obtained channel occupancy threshold, the quality criterion and at least one RSSI sample of the set of RSSI samples, and perform at least one task based on the channel occupancy measurement. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value.

According to aspect of the disclosure, memory 20 contains further instructions that, when executed by processor 18, further configure processor 18 to perform the methods described above.

According to aspect of the disclosure, node 14 for a wireless communication network is provided. Node 14 includes means for obtaining a channel occupancy threshold, means for obtaining a quality criterion for a channel occupancy measurement, and means for configuring wireless device 12 to perform the channel occupancy measurement based on the channel occupancy threshold and the quality criterion, wireless device 12 being configured for carrier aggregation under operation with frame structure type 3. The quality criterion defines a quality of an RSSI sample based on whether a value of the RSSI sample is within a range of a value of the channel occupancy threshold, the threshold being defined by the value of the channel occupancy threshold plus an RSSI measurement accuracy value and the value of the channel occupancy threshold minus the RSSI measurement accuracy value; and According to aspect of the disclosure, node 14 for a wireless communication network is provided. Node 14 includes processing circuitry 34. Processing circuitry 34 includes processor 28 and memory 30. Memory 30 contains instructions that, when executed by processor 28, configure processor 28 to: obtain a channel occupancy threshold, obtain a quality criterion for a channel occupancy measurement, and configure wireless device 12 to perform the channel occupancy measurement based on the channel occupancy threshold and the quality criterion, wireless device 12 being configured for carrier aggregation under operation with frame structure type 3. The quality criterion defines a quality of an RSSI sample based on whether a value of the RSSI sample is within a range of a value of the channel occupancy threshold. The range is defined by the value of the channel occupancy threshold plus an RSSI measurement accuracy value and the value of the channel occupancy threshold minus the RSSI measurement accuracy value.

Additional embodiments of the disclosure are described as follows.

Embodiment 1

A wireless device 12, comprising processing circuitry 24, the processing circuitry 24 including a processor 18 and a memory 20, the memory 20 containing instructions that, when executed by the processor 18, configure the processor 18 to:
obtain a channel occupancy threshold;
obtain a set of received signal strength indication, RSSI, samples;
obtain at least one quality criteria for a channel occupancy measurement; and
obtain a channel occupancy measurement based on the channel quality threshold, the at least one quality criteria and the RSSI samples.

Embodiment 2

The wireless device 12 of Embodiment 1, wherein the memory contains further instructions that, when executed by the processor 28, configure the processor 28 to send at least one result of the channel occupancy measurement.

Embodiment 3

The wireless device 12 of Embodiment 1, wherein the memory 30 contains further instructions that, when executed by the processor 28, configure the processor 28 to perform at least one operational task using the channel occupancy measurement.

Embodiment 4

The wireless device 12 of Embodiment 1, wherein the at least one quality criteria is defined by at least a portion of RSSI values that do not belong to a predefined range.

Embodiment 5

The wireless device 12 of Embodiment 4, wherein the predefined range is based on the capability of the wireless device 12 to perform at least one measurement in a predefined manner.

Embodiment 6

The wireless device 12 of Embodiment 4, wherein the predefined range is based on an RSSI accuracy requirement defined by ±A dBm, where A depends on at least one of a frequency and the frequency's relation to a serving frequency.

Embodiment 7

A method for a wireless device 12, the method comprising:
obtaining a channel occupancy threshold;
obtaining a set of received signal strength indication, RSSI, samples;
obtaining at least one quality criteria for a channel occupancy measurement; and
obtaining a channel occupancy measurement based on the channel quality threshold, the at least one quality criteria and the RSSI samples.

Embodiment 8

The method of Embodiment 7, further comprising sending at least one result of the channel occupancy measurement.

Embodiment 9

The method of Embodiment 7, further comprising performing at least one operational task using the channel occupancy measurement.

Embodiment 10

The method of Embodiment 7, wherein the at least one quality criteria is defined by at least a portion of RSSI values that do not belong to a predefined range.

Embodiment 11

The method of Embodiment 10, wherein the predefined range is based on the capability of the wireless device 12 to perform at least one measurement in a predefined manner.

Embodiment 12

The method of Embodiment 10, wherein the predefined range is based on an RSSI accuracy requirement defined by ±A dBm, where A depends on at least one of a frequency and the frequency's relation to a serving frequency.

Embodiment 13

A network node 14, comprising processing circuitry 34, the processing circuitry 34 including a processor 28 and a memory 30, the memory 30 containing instructions that, when executed by the processor 28, configure the processor 28 to:
obtain at least one quality criteria; and
configure at least one parameter for at least one of a channel occupancy measurement configuration and received signal strength indication, RSSI, measurement configuration based on the at least one quality criteria.

Embodiment 14

The network node 14 of Embodiment 13, wherein the at least one quality criteria is obtained based on received wireless device measurements.

Embodiment 15

The network node 14 of Embodiment 13, wherein the at least one parameter is at least one of a channel occupancy threshold, an offset of adjustment to be applied to the channel occupancy threshold and an indication to allows a wireless device to autonomously adjust the channel occupancy threshold.

Embodiment 16

The network node 14 of Embodiment 15, wherein the maximum amount of adjustment the wireless device is allowed to apply is 3 dB.

Embodiment 17

The network node 14 of Embodiment 13, wherein the memory 30 contains further instructions that, when executed by the processor 28, configure the processor 28 to send at least one of the channel occupancy measurement configuration and RSSI measurement configuration to one of another network node and wireless device.

Embodiment 18

The network node 14 of Embodiment 13, wherein the memory 30 contains further instructions that, when executed by the processor 28, configure the processor 28 to send the at least one quality criteria to one of another network node 14 and wireless device 12.

Embodiment 19

A method for a network node 12, the method comprising:
obtaining at least one quality criteria; and
configuring at least one parameter for at least one of a channel occupancy measurement configuration and received signal strength indication, RSSI, measurement configuration based on the at least one quality criteria.

Embodiment 20

The method of Embodiment 19, wherein the at least one quality criteria is obtained based on received wireless device measurements.

Embodiment 21

The method of Embodiment 19, wherein the at least one parameter is at least one of a channel occupancy threshold, an offset of adjustment to be applied to the channel occupancy threshold and an indication to allows a wireless device 12 to autonomously adjust the channel occupancy threshold.

Embodiment 22

The method of Embodiment 21, wherein the maximum amount of adjustment the wireless device 12 is allowed to apply is 3 dB.

Embodiment 23

The method of Embodiment 19, further comprising sending at least one of the channel occupancy measurement configuration and RSSI measurement configuration to one of another network node 14 and wireless device 12.

Embodiment 24

The method of Embodiment 19, further comprising sending the at least one quality criteria to one of another network node 14 and wireless device 12.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure.

What is claimed is:

1. A method for a wireless device for a wireless communication network, the wireless device being configured for carrier aggregation, the method comprising:
   obtaining a channel occupancy threshold;
   obtaining a set of received signal strength indication, RSSI, samples on a carrier frequency;
   obtaining a quality criterion for a channel occupancy measurement, the quality criterion defining a quality of an RSSI sample based on whether a value of the RSSI sample is not within a range, which is defined by a value of the channel occupancy threshold plus an RSSI measurement accuracy value and the value of the channel occupancy threshold minus the RSSI measurement accuracy value;
   determining the channel occupancy measurement for the carrier frequency based on the obtained channel occupancy threshold and the quality criterion, and further based on either (a) a subset of the set of RSSI samples having values that are not within the range or (b) the set of RSSI samples only if, in the set of RSSI samples, a number or percentage of RSSI samples having values within the range is less than a threshold; and
   performing at least one task based on the channel occupancy measurement.

2. The method of claim 1, wherein the obtaining of the channel occupancy threshold includes receiving a configuration message, the configuration message defining the channel occupancy threshold.

3. The method of claim 1, wherein the determining of the channel occupancy measurement includes determining whether at least one RSSI sample of the set of RSSI samples meets the quality criterion.

4. The method of claim 1, wherein the obtaining of the quality criterion for the channel occupancy measurement includes receiving signaling, from a node, corresponding to the quality criterion.

5. The method of claim 4, wherein the obtaining of the quality criterion for the channel occupancy measurement includes calculating the quality criterion.

6. The method of claim 3, further comprising:
   if the determination is made that at least one RSSI sample of the set of RSSI samples does not meet the quality criterion, selecting a subset of the set of RSSI samples that meet the quality criterion for determining the channel occupancy measurement for the carrier frequency.

7. The method of claim 3, further comprising:
   if the determination is made that at least one RSSI sample of the set of RSSI samples does not meet the quality criterion:
      assigning a first numerical weight to the at least one RSSI sample of the set of RSSI samples that does not meet the quality criterion;
      assigning a second numerical weight to a to a remaining at least one RSSI sample of the set of RSSI samples that meet the quality criterion, the first numerical weight being lower than the second numerical weight; and
      the channel occupancy measurement for the carrier frequency being determined based on the first numerical weight and second numerical weight.

8. The method of claim 1, wherein the quality criterion is based on interference characteristics.

9. The method of claim 1, wherein the quality criterion for the channel occupancy measurement is based on a capability of the wireless device to perform at least one measurement in a predefined manner.

10. The method of claim 1, wherein the performing of the at least one task includes at least one of sending at least one result of the channel occupancy measurement and triggering an event based on the channel occupancy measurement.

11. The method of claim 1, wherein the performing of at least one task includes at least one of reporting the channel occupancy measurement, preventing a reporting of at least one result of the channel occupancy measurement if a predefined number of the RSSI samples of the set of RSSI samples do not meet the quality criterion, and adjusting the channel occupancy threshold based on the channel occupancy measurement.

12. The method of claim 1, wherein the RSSI measurement accuracy value depends on at least one of the carrier frequency and the carrier frequency's relation to a serving frequency of the wireless device.

13. A method for a node for a wireless communication network, the method comprising:
obtaining a channel occupancy threshold;
obtaining a quality criterion for a channel occupancy measurement, the quality criterion defining a quality of an RSSI sample based on whether a value of the RSSI sample is not within a range, which is defined by a value of the channel occupancy threshold plus an RSSI measurement accuracy value and the value of the channel occupancy threshold minus the RSSI measurement accuracy value; and
configuring a wireless device to perform the channel occupancy measurement based on the channel occupancy threshold and the quality criterion, wherein when the value of the RSSI sample is not within the range, the RSSI sample is eligible to be used for performing the channel occupancy measurement.

14. The method of claim 13, wherein the obtaining of the quality criterion for the channel occupancy measurement includes receiving signaling, from a node, corresponding to the quality criterion.

15. The method of claim 13, wherein the obtaining of the quality criterion for the channel occupancy measurement includes calculating the quality criterion.

16. The method of claim 13, wherein the quality criterion is based on interference characteristics.

17. The method of claim 13, wherein the quality criterion for the channel occupancy measurement is based on a capability of the wireless device to perform at least one measurement in a predefined manner.

18. The method of claim 13, wherein the RSSI measurement accuracy value depends on at least one of the carrier frequency and the carrier frequency's relation to a serving frequency of the wireless device.

19. A wireless device for a wireless communication network, the wireless device being configured for carrier aggregation under, the wireless device comprising:
processing circuitry, the processing circuitry including a processor and a memory, the memory containing instructions that, when executed by the processor, configure the processor to:
obtain a channel occupancy threshold;
obtain a set of received signal strength indication, RSSI, samples on a carrier frequency;
obtain a quality criterion for a channel occupancy measurement, the quality criterion defining a quality of an RSSI sample based on whether a value of the RSSI sample is not within a range, which is defined by a value of the channel occupancy threshold plus an RSSI measurement accuracy value and the value of the channel occupancy threshold minus the RSSI measurement accuracy value;
determine the channel occupancy measurement for the carrier frequency based on the obtained channel occupancy threshold and the quality criterion and further based on either: (a) a subset of the set of RSSI samples having values that are not within the range or (b) the set of RSSI samples only if, in the set of RSSI samples, a number or percentage of RSSI samples having values within the range is less than a threshold; and
perform at least one task based on the channel occupancy measurement.

20. The wireless device of claim 19, wherein the obtaining of the channel occupancy threshold includes receiving a configuration message from a network node, the configuration message defining the channel occupancy threshold.

21. The wireless device of claim 19, wherein the determining of the channel occupancy measurement includes determining whether at least one RSSI sample of the set of RSSI samples meets the quality criterion.

22. A node for a wireless communication network, the node comprising:
processing circuitry, the processing circuitry including a processor and a memory, the memory containing instructions that, when executed by the processor, configure the processor to:
obtain a channel occupancy threshold;
obtain a quality criterion for a channel occupancy measurement, the quality criterion defining a quality of an RSSI sample based on whether a value of the RSSI sample is not within a range, which is defined by a value of the channel occupancy threshold plus an RSSI measurement accuracy value and the value of the channel occupancy threshold minus the RSSI measurement accuracy value; and
configure a wireless device to perform the channel occupancy measurement based on the channel occupancy threshold and the quality criterion, wherein when the value of the RSSI sample is not within the range, the RSSI sample is eligible to be used for performing the channel occupancy measurement.

* * * * *